United States Patent
Okada et al.

(10) Patent No.: US 9,632,385 B2
(45) Date of Patent: Apr. 25, 2017

(54) ELECTROCHROMIC DISPLAY DEVICE WITH INTERMEDIATE DISPLAY ELECTRODE CONTAINING ELECTRICALLY CONDUCTIVE FINE PARTICLE AND A METHOD FOR MANUFACTURING SUCH DEVICE

(71) Applicants: Yoshinori Okada, Kanagawa (JP); Tohru Yashiro, Kanagawa (JP); Yoshihisa Naijo, Kanagawa (JP); Sukchan Kim, Kanagawa (JP); Shigenobu Hirano, Kanagawa (JP); Koh Fujimura, Tokyo (JP); Hiroyuki Takahashi, Kanagawa (JP); Kazuaki Tsuji, Kanagawa (JP); Toshiya Sagisaka, Kanagawa (JP); Keiichiroh Yutani, Kanagawa (JP); Mamiko Inoue, Kanagawa (JP)

(72) Inventors: Yoshinori Okada, Kanagawa (JP); Tohru Yashiro, Kanagawa (JP); Yoshihisa Naijo, Kanagawa (JP); Sukchan Kim, Kanagawa (JP); Shigenobu Hirano, Kanagawa (JP); Koh Fujimura, Tokyo (JP); Hiroyuki Takahashi, Kanagawa (JP); Kazuaki Tsuji, Kanagawa (JP); Toshiya Sagisaka, Kanagawa (JP); Keiichiroh Yutani, Kanagawa (JP); Mamiko Inoue, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 324 days.

(21) Appl. No.: 13/849,079

(22) Filed: Mar. 22, 2013

(65) Prior Publication Data
US 2013/0250394 A1    Sep. 26, 2013

(30) Foreign Application Priority Data

Mar. 23, 2012 (JP) .............................. 2012-066676
Dec. 4, 2012 (JP) .............................. 2012-265704

(51) Int. Cl.
*G02F 1/153* (2006.01)
*G02F 1/155* (2006.01)
*G02F 1/157* (2006.01)

(52) U.S. Cl.
CPC ............. *G02F 1/155* (2013.01); *G02F 1/157* (2013.01); *G02F 2001/1552* (2013.01)

(58) Field of Classification Search
CPC ............................. G02F 1/155; G02F 1/153
(Continued)

(56) References Cited

U.S. PATENT DOCUMENTS 6,301,038 B1  10/2001  Fitzmaurice et al.
6,858,318 B2   2/2005  Kogiso et al.
(Continued)

FOREIGN PATENT DOCUMENTS

JP       3560333       9/2004
JP    2007-171781      7/2007
(Continued)

OTHER PUBLICATIONS

Jun. 7, 2016 Japanese official action in connection with Japanese patent application No. 2012-265704.

Primary Examiner — Bumsuk Won
Assistant Examiner — Tamara Y Washington
(74) Attorney, Agent, or Firm — Cooper & Dunham LLP

(57) ABSTRACT

Disclosed is an electrochromic display device including a display substrate, a display electrode provided on the display substrate, a first electrochromic layer provided on the display electrode, an intermediate display electrode provided
(Continued)

above the first electrochromic layer separately from the first electrochromic layer, a second electrochromic layer provided on and contacting the intermediate display electrode, an opposed substrate, an opposed electrode provided on the opposed substrate, and an electrolyte solution provided between a surface of the display substrate on which the display electrode is formed and a surface of the opposed substrate on which the opposed electrode is formed, wherein the intermediate display electrode contains a rod-shaped, whisker-shaped, or long-fiber-shaped electrically conductive fine particle, and at least a portion of a space in the electrically conductive fine particle is filled with a material forming the second electrochromic layer.

9 Claims, 3 Drawing Sheets

(58) Field of Classification Search
USPC .......................................... 359/269, 290–298
See application file for complete search history.

(56) References Cited

U.S. PATENT DOCUMENTS

| | | | |
|---|---|---|---|
| 7,990,602 B2 | 8/2011 | Tatsuura et al. | |
| 2005/0007648 A1* | 1/2005 | Wu et al. | 359/296 |
| 2010/0002282 A1* | 1/2010 | Agrawal et al. | 359/275 |
| 2010/0039690 A1 | 2/2010 | Agrawal et al. | |
| 2011/0013261 A1* | 1/2011 | Hattori | G02F 1/1506 359/297 |
| 2011/0222139 A1 | 9/2011 | Naijo et al. | |
| 2011/0309347 A1 | 12/2011 | Okada et al. | |
| 2012/0050838 A1* | 3/2012 | Hirano et al. | 359/273 |
| 2012/0139824 A1 | 6/2012 | Takahashi et al. | |
| 2012/0139825 A1 | 6/2012 | Yashiro et al. | |
| 2012/0154892 A1 | 6/2012 | Yashiro et al. | |

FOREIGN PATENT DOCUMENTS

| | | |
|---|---|---|
| JP | 3955641 | 8/2007 |
| JP | 2008-116718 | 5/2008 |
| JP | 2009-505358 | 2/2009 |
| JP | 2009-127092 | 6/2009 |
| JP | 2009-163005 | 7/2009 |
| JP | 2009-252014 | 10/2009 |
| JP | 2009-253016 | 10/2009 |
| JP | 2010-033016 | 2/2010 |
| JP | 2010-118165 | 5/2010 |
| JP | 2010-282128 | 12/2010 |
| JP | 2011-082092 | 4/2011 |
| WO | WO 2007/022226 A2 | 2/2007 |

* cited by examiner

ELECTROCHROMIC DISPLAY DEVICE WITH INTERMEDIATE DISPLAY ELECTRODE CONTAINING ELECTRICALLY CONDUCTIVE FINE PARTICLE AND A METHOD FOR MANUFACTURING SUCH DEVICE

BACKGROUND OF THE INVENTION

1. Field of the Invention

An aspect of the present invention relates to at least one of an electrochromic display device and a method for manufacturing an electrochromic display device.

2. Description of the Related Art

In recent years, a need for an electronic paper as an electronic medium that replaces a paper is growing and its development has been conducted actively. For means for realizing such a display system, development of a self-emitting display technique such as a liquid crystal display or an organic EL display is proceeding and a part thereof is being produced. Meanwhile, a reflection-type display technique with low electric power consumption and a less visual fatigue is promising as a next-generation electronic paper display technique.

For a reflection-type display technique, for example, a reflection-type liquid crystal display technique using a cholesteric liquid crystal has been devised. However, such a display technique utilizes a selective reflection or involves a large number of substrates, so as to be poor in reflectivity, contrast, color saturation, and a color reproduction range, and provide a visibility that is far inferior to that of a "paper".

Furthermore, an electrochromic display technique composed of an organic electrochromic material provided with both a high color reproducibility and a display memory property is attracting much attention in a reflection-type display technique. A phenomenon in which an electric voltage is applied to cause an oxidation reduction reaction reversibly and change a color reversibly is referred to as "electrochromism". An electrochromic display device is a display device utilizing color appearance/color disappearance (which will be referred to as "coloring/discoloring" below) of an electrochromic compound that causes such a phenomenon of electrochromism. Such an electrochromic display device is a reflection-type display device, has a display memory property, and is able to be driven at a low voltage, and hence, study and development, such as material development to device designing, have widely been conducted as a potent candidate for an electronic display technique for an electronic paper application.

An electrochromic display device is able to develop various colors depending on a structure of an electrochromic compound, and hence, is expected as a multicolor display device. For multicolor display techniques, Japanese Patent Application Publication No. 2009-163005 and Japanese Patent Application Publication No. 2010-033016 disclose configurations in which a plurality of layers of display electrodes and an electrochromic coloring layer are laminated on one display substrate.

Japanese Patent Application Publication No. 2009-163005 discloses that an intermediate display electrode provided between a display electrode and an opposed electrode is formed by an indium tin oxide (which will be described as ITO below) fine particle. For an electrically conductive film formed by an ITO fine particle, it is known that a volume resistivity thereof is 2-5 digits higher as compared with that of an ITO electrically conductive film formed by a vacuum film formation such as a sputtering method. A display electrode layer with a low electrical conductivity is a cause that produces an in-plane non-uniformity in a display image as a surface area of a display electrode is increased. Furthermore, as a film thickness of an ITO fine particle display electrode layer is increased to improve an electrical conductivity, a cause is provided that causes degradation of a reflectivity and degradation of a display image quality.

Furthermore, Japanese Patent Application Publication No. 2010-033016 discloses a display electrode and insulating layer that have permeability into an electrolyte, and further discloses that an ITO film formed by a sputtering method is used for the display electrode. However, an ITO film formed by a sputtering method is dense, has a poor ion permeability, and has a disadvantage in such a manner that a large voltage is needed for a coloring and discoloring reaction of an electrochromic layer provided adjacently to a display electrode that is not directly opposed to an opposed electrode via an electrolyte. That is, there is a problem in such a manner that a coloring and discoloring voltage for an electrochromic layer provided separately from an opposed substrate is increased even if a plurality of pairs of display electrodes and an electrochromic layer are laminated.

Furthermore, Japanese Patent Application Publication No. 2010-282128 discloses a method for holding an electrochromic layer on a porous sheet body having an electrical conductivity and superposing a plurality of porous sheets thereon. However, there is a problem of a display image blur that originates from an increase in a distance from an opposed electrode to each display electrode due to a thickness of a porous sheet per se of an increase of a driving voltage.

Meanwhile, a transparent electrically conductive film formed by a long-fiber-shaped electrically conductive particle has characteristics of a high transmittance of visible light, a low surface resistance, a high distortion resistance or flexion resistance, a capability of being formed by each kind of printing method without needing a vacuum film formation, etc., and study and development have been conducted as an alternative to a transparent electrically conductive film such as ITO. Furthermore, applications to a touch panel, a liquid crystal display device, a solar cell, an organic electroluminescence display device, etc., have also been investigated (for example, Japanese Patent No. 3560333, Japanese Patent Application Publication No. 2009-252014, Japanese Patent Application Publication No. 2011-082092, Japanese Patent Application Publication No. 2009-253016, and Japanese Patent Application Publication No. 2010-118165).

For example, Japanese Patent Application Publication No. 2009-253016 discloses a solar cell using a metal nanowire as an electrode on a substrate but this relates to a dye-sensitized solar cell and is a metal nanowire as an electrically conductive layer provided on a substrate.

Furthermore, there are problems in such a manner that a silver nanowire that is a long-fiber-shaped electrically conductive particle is generally readily degraded by an oxidation reduction reaction and migration is readily caused due to presence of an ion. As a measure for solving such a matter, Japanese Patent Application Publication No. 2009-127092 discloses a method for preventing migration by applying a plating treatment with another metal atom to a surface of a silver nanowire.

Moreover, a transparent electrically conductive film formed by a long-fiber-shaped electrically conductive particle generally has a weak film strength, and hence, a part of an electrically conductive particle is generally fixed by an overcoat such as a polymer. Hence, an overcoat with no ion permeability is generally used in order to prevent silver migration.

SUMMARY OF THE INVENTION

According to one aspect of the present invention, there is provided an electrochromic display device including a display substrate, a display electrode provided on the display substrate, a first electrochromic layer provided on the display electrode, an intermediate display electrode provided above the first electrochromic layer separately from the first electrochromic layer, a second electrochromic layer provided on and contacting the intermediate display electrode, an opposed substrate, an opposed electrode provided on the opposed substrate, and an electrolyte solution provided between a surface of the display substrate on which the display electrode is formed and a surface of the opposed substrate on which the opposed electrode is formed, wherein the intermediate display electrode contains a rod-shaped, whisker-shaped, or long-fiber-shaped electrically conductive fine particle, and at least a portion of a space in the electrically conductive fine particle is filled with a material forming the second electrochromic layer.

According to another aspect of the present invention, there is provided an electrochromic display device including a display substrate, a display electrode provided on the display substrate, a first electrochromic layer provided on the display electrode, an intermediate display electrode provided above the first electrochromic layer separately from the first electrochromic layer, a second electrochromic layer provided on and contacting the intermediate display electrode, an opposed substrate, an opposed electrode provided on the opposed substrate, and an electrolyte solution provided between a surface of the display substrate on which the display electrode is formed and a surface of the opposed substrate on which the opposed electrode is formed, wherein the intermediate display electrode contains a rod-shaped, whisker-shaped, or long-fiber-shaped electrically conductive fine particle, and a part of the electrically conductive fine particle forming the intermediate display electrode penetrates into a part of the second electrochromic layer.

According to another aspect of the present invention, there is provided an electrochromic display device including a display substrate, a display electrode provided on the display substrate, an electrochromic layer provided on the display electrode, an opposed substrate, an opposed electrode provided on the opposed substrate, and an electrolyte solution provided between a surface of the display substrate on which the display electrode is formed and a surface of the opposed substrate on which the opposed electrode is formed, wherein 1 or 2 or more of lamination films formed by laminating an intermediate display electrode provided separately from the electrochromic layer and an other electrochromic layer provided on and contacting the intermediate display electrode are laminated on the electrochromic layer, the intermediate display electrode contains a rod-shaped, whisker-shaped, or long-fiber-shaped electrically conductive fine particle, and at least a portion of a space in the electrically conductive fine particle is filled with a material forming the other electrochromic layer.

According to another aspect of the present invention, there is provided a method for manufacturing an electrochromic display device including a display substrate, a display electrode provided on the display substrate, a first electrochromic layer provided on the display electrode, an intermediate display electrode provided above the first electrochromic layer separately from the first electrochromic layer, a second electrochromic layer provided on and contacting the intermediate display electrode, an opposed substrate, an opposed electrode provided on the opposed substrate, and an electrolyte solution provided between a surface of the display substrate on which the display electrode is formed and a surface of the opposed substrate on which the opposed electrode is formed, wherein the intermediate display electrode contains a rod-shaped, whisker-shaped, or long-fiber-shaped electrically conductive fine particle, at least a portion of a space in the electrically conductive fine particle is filled with a material forming the second electrochromic layer, and a part of the second electrochromic layer is formed before the intermediate display electrode is formed.

DETAILED DESCRIPTION OF THE PREFERRED EMBODIMENTS

Figure 1:
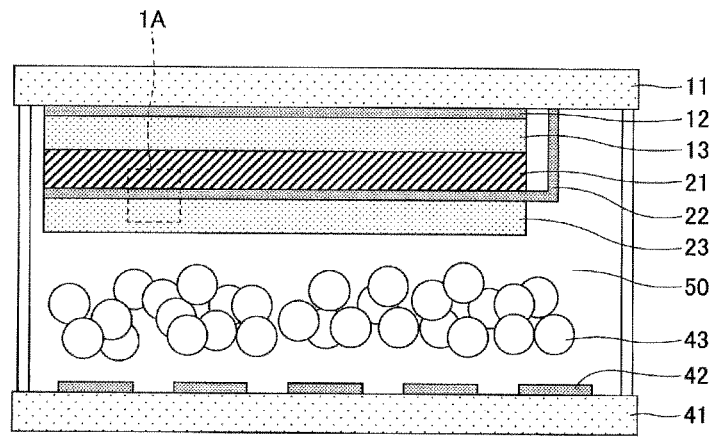
FIG. 1 is a structural diagram of an electrochromic display device in a first embodiment.

An embodiment of the present invention will be described below. Additionally, an identical member, etc., will be provided with an identical reference numeral to omit a description(s) thereof.

A First Embodiment

An Electrochromic Display Device

An electrochromic display device in a first embodiment will be described based on FIG. 1. FIG. 1 is a schematic diagram illustrating a structure of an electrochromic display device in a first embodiment. Additionally, an embodiment described below is a preferred embodiment of the present invention and the scope of the present invention shall not be limited to these aspects unless there is a description in such a manner that the present invention is limited, in the following description(s).

As illustrated in FIG. 1, an electrochromic display device in the present embodiment has a display substrate 11 and an opposed substrate 41 that are supporting substrates provided outside. The display substrate 11 has a first display electrode 12 formed on and contacting the display substrate 11, a first electrochromic layer 13 provided on and contacting the first display electrode 12, an insulating layer 21 provided on and contacting the first electrochromic layer 13, a second display electrode 22 provided on and contacting the insulating layer 21 and containing a rod-shaped, whisker-shaped, or a long-fiber-shaped electrically conductive fine particle, and a second electrochromic layer 23 provided on and contacting the second display electrode 22. Furthermore, an opposed electrode 42 is formed on a surface of the opposed substrate 41, while impregnation with an electrolyte solution 50 in which an electrolyte is dissolved is conducted and further a white reflection layer 43 is provided between the first display electrode 12 formed on the display substrate 11 and the opposed electrode 42 formed on the opposed substrate 41. Additionally, a product provided by laminating the second display electrode 22 and the second electrochromic layer 23 may be described as a lamination film in the present embodiment.

The display substrate 11 is a substrate for supporting a lamination structure described above. Additionally, the second display electrode 22 is an intermediate display electrode and may be described as an intermediate display electrode, and further, the first display electrode 12 may simply be described as a display electrode.

The first electrochromic layer 13 and the second electrochromic layer 23 are porous electrodes composed of an electrically conductive or semiconductor fine particle and an electrochromic molecule carried on such a fine particle and exhibiting color changing due to an oxidation reduction reaction.

It is desirable that the first electrochromic layer 13 and the second electrochromic layer 23 are composed of electrochromic molecules exhibiting different colors due to an oxidation reduction reaction. Thereby, a two-color display is possible. Furthermore, it is preferable that molecular structures of electrochromic compounds in the first electrochromic layer 13, the second electrochromic layer 23, etc., provided on and contacting a plurality of display electrodes such as the first display electrode 12 and the second display electrode 22 are similar. As a similar material structure is adopted, it is possible to provide similar coloring and discoloring electric potentials of the respective display electrodes and it is possible to readily control coloring and discoloring with respect to an identical electrolyte. Furthermore, a third display electrode that is a second intermediate display electrode containing a rod-shaped, whisker-shaped, or long-fiber-shaped electrically conductive fine particle and a third electrochromic layer contacting the third display electrode are provided via an insulation layer similarly, and further, a fourth display electrode that is a third intermediate display electrode containing a rod-shaped, whisker-shaped, or long-fiber-shaped electrically conductive fine particle and a fourth electrochromic layer contacting the fourth display electrode are provided via another insulating layer, so that even a further multicolor display is possible.

The Display Substrate 11

The display substrate 11 is not particularly limited as long as a transparent material is provided, and a substrate such as a glass substrate, a plastic film, etc., is used. Furthermore, a coating such as a transparent insulating layer, an antireflection layer, etc., may be provided on a front and a back of the display substrate 11 in order to increase a water vapor barrier property, a gas barrier property, and visibility.

The Opposed Substrate 41

The opposed substrate 41 is not particularly required to be transparent, and hence, a glass substrate, a plastic film, a silicon substrate, a metal substrate such as stainless steel, and lamination thereof, etc., are used.

The First Display Electrode 12

The first display electrode 12 is not particularly limited as long as a material having a transparency and an electrical conductivity is provided. That is, the first display electrode 12 is transparent or translucent and is formed of a material having an electrical conductivity. Specifically, for a material forming the first display electrode 12, metal oxide such as indium oxide, zinc oxide, tin oxide, indium tin oxide, or indium zinc oxide is desirable. Furthermore, a network electrode of silver, gold, a carbon nanotube, a metal oxide, etc., having a transparency, or a composite layer thereof is also useful. A method for fabricating the first display electrode 12 is a vacuum deposition method, a sputtering method, or an ion plating method, or as long as it is possible to conduct formation by application of a material for forming the first display electrode 12, it is also possible to use a spin coat method, a casting method, a microgravure coat method, a gravure coat method, a bar coat method, a roll coat method, a wire bar coat method, a dip coat method, a slit coat method, a capillary coat method, a spray coat method, a nozzle coat method, or each kind of printing method such as a gravure printing method, a screen printing method, a flexographic printing method, an offset printing method, a reverse printing method, or an ink jet print method. A transmittance of the first display electrode 12 is preferably greater than or equal to 60% and less than 100%, and more preferably, 90% or greater and less than 100%.

The Second Display Electrode 22

The second display electrode 22 is an intermediate display electrode and contains a rod-shaped, whisker-shaped or long-fiber-shaped electrically conductive fine particle, wherein at least a portion of a space in such an electrically conductive fine particle is filled with at least a portion of the second electrochromic layer 23. Additionally, the second display electrode 22 is transparent or translucent and is formed of a material having an electrical conductivity.

In the present embodiment, it is possible to use carbon, each kind of metal or metal oxide or a composite material thereof preferably for a rod-shaped, whisker-shaped, or long-fiber-shaped electrically conductive fine particle. For a carbon material, it is possible to use a long-fiber-shaped material such as a carbon nanotube or graphene nanoribbon. In particular, it is possible to use a carbon nanotube preferably in terms of an excellent electrical conductivity and easy fabrication or film formation. For a metal material, it is possible to use, for example, iron, cobalt, nickel, copper, zinc, ruthenium, rhodium, palladium, silver, osmium, iridium, platinum, gold, etc. More preferably, it is possible to use each of silver, platinum, and gold preferably in terms of easy fabrication or difficulty to be oxidized or reduced. Among these, it is possible to use a silver nanowire preferably in terms of a capability of inexpensive fabrication and an excellent electrical conductivity. For a metal oxide material, it is preferable to contain an oxide of at least one kind of metal selected from zinc, indium, tin, and gallium, as a main component. That is, it is possible to preferably use a transparent electrically conductive metal oxide whose main component is any one or more of indium oxide, tin oxide, and zinc oxide, for example, materials such as indium tin oxide (ITO), indium zinc oxide (IZO), indium tungsten oxide (IWO), indium titanium oxide (ITiO), indium zirconium oxide, tin antimony oxide (ATO), fluorine tin oxide (FTO), aluminum zinc oxide (AZO), gallium zinc oxide (GZO), and β-gallium oxide. An electrically conductive fine particle is not limited to them as long as a high transmittance in a visible light region or a high electrical conductivity is provided.

In the present embodiment, when a silver nanowire is used for a rod-shaped, whisker-shaped, or long-fiber-shaped electrically conductive fine particle, it is desirable to provide a protective layer on a surface of an electrically conductive fine particle in order to suppress migration of silver. For a method for forming a protective layer, it is possible to use each kind of publicly known plating treatment. In particular, electrical conduction is not necessary for an electroless plating method, differently from an electroplating treatment, and it is possible to conduct a plating treatment with a uniform film thickness, so that it is possible to be preferably used for forming a protective layer for an electrically conductive fine particle. Furthermore, an electrochromic material of an electrochromic layer exhibits a color change between coloring and discoloring caused by an oxidation reduction reaction, and hence, it is possible for a protective layer to suppress an oxidation reduction reaction of an intermediate display electrode per se, and provide an intermediate display electrode excellent in durability thereof.

In the present embodiment, for a method for forming a rod-shaped, whisker-shaped, or long-fiber-shaped electrically conductive fine particle, it is possible to use a general coating method as long as dispersion in, for example, water or an organic solvent is possible. For example, it is also possible to use a spin coat method, a casting method, a microgravure coat method, a gravure coat method, a bar coat method, a roll coat method, a wire bar coat method, a dip coat method, a slit coat method, a capillary coat method, a spray coat method, a nozzle coat method, or each kind of printing method such as a gravure printing method, a screen printing method, a flexographic printing method, an offset printing method, a reverse printing method, or an ink jet print method. Furthermore, film formation of a carbon nanotube is directly conducted on the insulating layer 21 by a chemical vapor deposition method so that it is possible to form the second display electrode 22 that is an intermediate display electrode.

In the present embodiment, for a shape of a rod-shaped, whisker-shaped, or long-fiber-shaped electrically conductive fine particle, it is preferable for a length in a minor axis direction to be, for example, greater than or equal to 1 nm and less than 500 nm. More preferable is 5-100 nm. If a length is greater than 500 nm, stable dispersion in a dispersion fluid may be difficult, and on the other hand, if a length is less than 1 nm, fabrication may be difficult. Furthermore, it is preferable for a length in a major axis direction to be, for example, greater than or equal to 1 nm and less than 500 μm. More preferable is greater than or equal to 10 μm and less than 300 μm. Drawbacks may be provided in such a manner that it is difficult for an excessively long one to attain stable dispersion in a dispersion fluid or coating formation and an excessively short one has a poor electrical conductivity.

In the present embodiment, a ratio (aspect ratio) of a length in a major axis direction to a length in a minor axis direction of a rod-shaped, whisker-shaped, or long-fiber-shaped electrically conductive fine particle is preferably greater than or equal to 10. More preferable is greater than or equal to 100. In the specification for the present application, electrically conductive fine particles with an aspect ratio of about 10 and an aspect ratio of about 100 and an electrically conductive fine particle having an aspect ratio greater than it are defined as a rod-shaped one, a whisker-shaped one and a long-fiber-shaped one, respectively. As an aspect ratio increases, the number of contact points with another electrically conductive fine particle increases, and hence, a surface resistance of an electrically conductive film formed by an electrically conductive fine particle is reduced. However, an electrically conductive fine particle with a large aspect ratio has a large major axis length accordingly, and hence, stable dispersion in a dispersion fluid may be difficult.

In the preset embodiment, for a rod-shaped, whisker-shaped, or long-fiber-shaped electrically conductive fine particle, it is desirable that a part or all of electrically conductive fine particles other than mutual contact points contact the second electrochromic layer 23. Thereby, it is possible to increase a contact area of the second electrochromic layer 23 and an electrically conductive fine particle constituting the second display electrode 22 and it is possible to conduct injection of an electric charge into the second electrochromic layer 23 efficiently. Hence, it is possible to suppress a driving voltage needed for coloring and discoloring of an electrochromic display device, and it is possible to reduce a driving time period.

Figure 2:
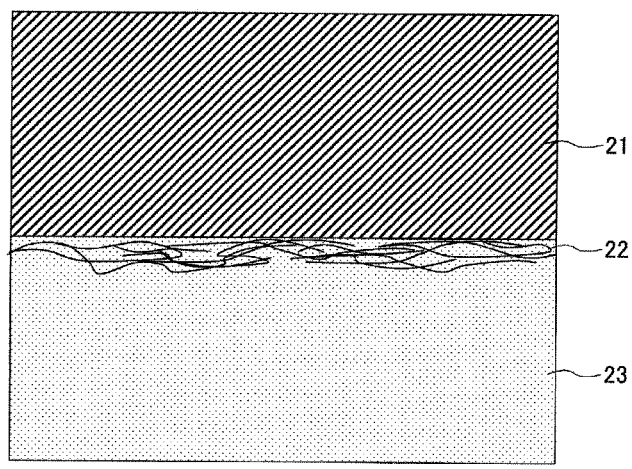
FIG. 2 is an illustration diagram of a second display electrode 22 and a second electrochromic layer 23.

FIG. 2 is an enlarged view of an area surrounded by a broken line 1A in FIG. 1. A rod-shaped, whisker-shaped, or long-fiber-shaped electrically conductive fine particle constituting the second display electrode 22 is formed to have a gap and is characterized in that the second electrochromic layer 23 penetrates into and is formed in such a gap. Herein, at least a portion of a space in the above-mentioned electrically conductive fine particle is filled with at least a part of the second electrochromic layer 23. Furthermore, it is preferable to increase a contact area between the above-mentioned electrically conductive fine particle and the second electrochromic layer, and as a result, it is preferable for the above-mentioned electrically conductive fine particle to be buried and formed in the second electrochromic layer 23.

The Opposed Electrode 42

The opposed electrode 42 is not particularly limited as long as a material having an electrical conductivity is provided. For a material for forming the opposed electrode 42, it is possible to use a metal oxide such as indium oxide, zinc oxide, tin oxide, indium tin oxide, or indium zinc oxide, or a metal such as zinc or platinum, carbon, or a composite film thereof, etc. Furthermore, a protective layer may be formed so as to cover the opposed electrode 42 in such a manner that the opposed electrode 42 is not irreversibly corroded by an oxidation reduction reaction. A method for fabricating the opposed electrode 42 is a vacuum deposition method, a sputtering method, or an ion plating method, or as long as it is possible to conduct formation by application of a material for forming the opposed electrode 42, it is also possible to use a spin coat method, a casting method, a microgravure coat method, a gravure coat method, a bar coat method, a roll coat method, a wire bar coat method, a dip coat method, a slit coat method, a capillary coat method, a spray coat method, a nozzle coat method, or each kind of printing method such as a gravure printing method, a screen printing method, a flexographic printing method, an offset printing method, a reverse printing method, or an ink jet print method.

A Protective Layer Covering the Opposed Electrode 42

A protective layer for covering the opposed electrode 42 is not particularly limited as long as a material serving to prevent corrosion of the opposed electrode 42 due to an irreversible oxidation reduction reaction is provided, and it is possible to use a variety of substances, such as an insulator material including $Al_2O_3$, $SiO_2$, or both, a metal oxide such as zinc oxide, titanium oxide, or tin oxide, or an organic material such as a polyimide. In particular, a material exhibiting a reversible oxidation reduction reaction and having an electrical conductivity or semi-conductivity is useful. For example, a method is provided for fixing an electrically conductive or semi-conductive metal oxide such as antimony tin oxide or nickel oxide on the opposed electrode 42 by, for example, an acryl-type, alkyd-type, isocyanate-type, urethane-type, epoxy-type, phenol-type binder, etc. A method for forming a protective layer is a vacuum deposition method, a sputtering method, or an ion plating method, or as long as application of a material for forming a protective layer is possible, it is also possible to use a spin coat method, a casing method, a microgravure coat method, a gravure coat method, a bar coat method, a roll coat method, a wire bar coat method, a dip coat method, a slit coat method, a capillary coat method, a spray coat method, a nozzle coat method, or each kind of printing method such as a gravure printing method, a screen printing method, a flexographic printing method, an offset printing method, a reverse printing method, or an ink jet print method.

An Electrochromic Layer

An electrochromic layer that is any of the first electrochromic layer 13 and the second electrochromic layer 23 contain an electrochromic material. For an electrochromic material, any of an inorganic electrochromic compound and an organic electrochromic compound may be used. Furthermore, it is also possible to use an electrically conductive polymer known as one exhibiting electrochromism. For an inorganic electrochromic compound, there are provided, for example, tungsten oxide, molybdenum oxide, iridium oxide, titanium oxide, etc. Furthermore, for an organic electrochromic compound, there are provided viologen, rare earth phthalocyanine, styryl, etc. Furthermore, for an electrically conductive polymer, there are provided poly(pyrrole), poly(thiophene), poly(aniline), a derivative thereof, etc.

Furthermore, in an electrochromic display device in the present embodiment, it is particularly desirable to use a structure of an organic electrochromic compound carried on an electrically conductive or semi-conductive fine particle, for electrochromic layers such as the first electrochromic layer 13 and the second electrochromic layer 23. Specifically, such a structure is provided by sintering a fine particle with a particle diameter of about 5 nm-50 nm on an electrode surface and adsorbing an organic electrochromic compound having a polar group such as a phosphonic acid, a carboxyl group, or a silanol group on a surface of such a fine particle. In such a structure, an effect of a large surface of a fine particle is utilized to inject an electron into an organic electrochromic compound efficiently, and hence, it is possible to attain a high-speed response as compared to a conventional electrochromic display element. Moreover, it is possible to form a transparent film as a display layer by using a fine particle, and hence, it is possible to obtain a high coloring density of an electrochromic dye. Furthermore, it is also possible to carry plural kinds of organic electrochromic compounds on an electrically conductive or semi-conductive fine particle.

Specifically, for a polymer-type or dye-type electrochromic compound, a low molecular weight organic electrochromic compound such as an azobenzene-type, an anthraquinone-type, a diarylethene-type, a dihydropyrene-type, dipyridine-type, a styryl-type, a styrylspiropyran-type, a spiro-oxazine-type, a spiro-thiopyran-type, a thioindigo-type, a tetrathiafulvalene-type, a terephthalic acid-type, a triphenylmethane-type, a triphenylamine-type, a naphthopyran-type, a viologen-type, a pyrazoline-type, a phenazine-type, a phenylenediamine-type, a phenoxazine-type, a phenothiazine-type, a phthalocyanine-type, a fluoran-type, a fulgide-type, a benzopyran-type, or a metallocene-type, or an electrically conductive polymer compound such as poly (aniline) or poly(thiophene) are used.

In particular, it is preferable to contain a viologen-type compound or a dipyridine-type compound. Such materials have low coloring and discoloring electric potentials and exhibit good color values even in a structure of plural display electrodes. Viologen-types in Japanese Patent No. 3955641 and Japanese Patent Application Publication No. 2007-171781, etc., and dipyridine-types in Japanese Patent Application Publication No. 2007-171781 and Japanese Patent Application Publication No. 2008-116718, etc. are disclosed.

In the above, moreover, it is preferable to contain a dipyridine-type compound represented by a general formula of chemical formula 1:

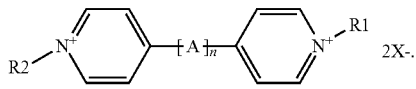

That is because such a material has low coloring and discoloring electric potentials, and hence, exhibits a good coloring color value due to a reduction potential even when an electrochromic display device is configured to have a plurality of display electrodes.

Additionally, in the general formula of chemical formula 1, each of R1 and R2 represents independently an alkyl group with a carbon number of 1 to 8 that may have a substituent or an aryl group, wherein at least one of R1 and R2 has a substituent selected from COOH, PO(OH)$_2$, and Si(oC$_k$H$_{2k+1}$)$_3$. X represents a monovalent anion. n represents 0, 1, or 2. k represents 0, 1, or 2. A represents an alkyl group with a carbon number 1 to 20 that may have a substituent, an aryl group, or a heterocyclic group.

On the other hand, for a metal-complex-type or metal-oxide-type electrochromic compound, an inorganic electrochromic compound such as titanium oxide, vanadium oxide, tungsten oxide, indium oxide, iridium oxide, nickel oxide, or Prussian blue is used.

An electrically conductive or semi-conductive fine particle that constitutes an electrochromic layer is not particularly limited and a metal oxide is desirable. For such a material, a metal oxide is used while a main component thereof is titanium oxide, zinc oxide, tin oxide, zirconium oxide, cerium oxide, yttrium oxide, boron oxide, magnesium oxide, strontium titanate, potassium titanate, barium titanate, calcium titanate, calcium oxide, ferrite, hafnium oxide, tungsten oxide, iron oxide, copper oxide, nickel oxide, cobalt oxide, barium oxide, strontium oxide, vanadium oxide, aluminosilicate, calcium phosphate, etc. Furthermore, such a metal oxide may be used singly or two or more kinds thereof may be mixed and used. In view of an electrical characteristic such as an electrical conductivity or a physical characteristic such as an optical property, it is possible to provide a multicolor display excellent in a response speed of coloring or discoloring when one kind selected from titanium oxide, zinc oxide, tin oxide, zirconium oxide, iron oxide, magnesium oxide, indium oxide, and tungsten oxide, or a mixture thereof is used. Inter alia, when titanium oxide is used, it is possible to provide a multicolor display more excellent in a response speed of coloring or discoloring.

Furthermore, a shape of an electrically conductive or semi-conductive fine particle is not particularly limited and a shape with a large surface area per unit volume (specific surface area, below) is used in order to carry an electrochromic compound efficiently. For example, when a fine particle is an aggregate of nanoparticles, an electrochromic compound is carried more efficiently by having a large specific surface area, and it is possible to provide a multicolor display excellent in a display contrast ratio between coloring and discoloring.

The Electrolyte Solution 50

The electrolyte solution 50 is composed of an electrolyte and a solvent for dissolving an electrolyte. When the display substrate 11 and the opposed substrate 41 are bonded, it is possible to impregnate with the electrolyte solution 50 a layer fabricated at a side of the display substrate 11 such as the first electrochromic layer 13, the insulating layer 21, the second display electrode 22, and the second electrochromic layer 23. Furthermore, at a step at which the first electrochromic layer 13, the insulating layer 21, the second display electrode 22, the second electrochromic layer 23, etc., are fabricated, it is also possible to distribute an electrolyte in each layer, and impregnate with a solvent when the display substrate 11 and the opposed substrate 41 are bonded. In such a method, it is possible to improve a rate of impregnation into each layer due to an osmotic pressure of the electrolyte solution 50.

For a material of an electrolyte, it is possible to use, for example, an inorganic ion salt such as an alkaline metal salt or an alkaline earth salt, a quaternary ammonium salt, or a supporting electrolyte of an acid or an alkali. Specifically, it is possible to use $LiClO_4$, $LiBF_4$, $LiAsF_6$, $LiPF_6$, $LiCF_3SO_3$, $LiCF_3COO$, $KCl$, $NaLiO_3$, $NaCl$, $NaBF_4$, $NaSCN$, $KBF_4$, $Mg(ClO_4)_2$, $Mg(BF_4)_2$, etc. Furthermore, it is also possible to use an ionic liquid. An ionic liquid may be any of generally disclosed substances. In particular, an organic ionic liquid has a molecular structure that exhibits liquid in a wide temperature range including room temperature. For an example of such a molecular structure, there are provided, as a cationic component, an aromatic salt such as an imidazole derivative such as an N,N-dimethylimidazole salt, an N,N-methylethylimidazole salt, or an N,N-methylpropylimidazole salt, or a pyridinium derivative such as an N,N-dimethylpyridinium salt or an N,N-methylpropylpyridinium salt, or an aliphatic quaternary ammonium type such as a tetraalkylammonium salt such as a trimethylpropylammonium salt, a trimethylhexylammonium salt, or a triethylhexyl ammonium salt. For an anionic component, it is preferable to provide a compound containing fluorine in view of stability in atmosphere, and there are provided $BF_4^-$, $CF_3SO_3^-$, $PF_6^-$, $(CF_3SO_2)_2N^-$, etc. It is possible to use an ionic liquid formulated by a combination of such a cationic component and an anionic component.

Furthermore, for an example of a solvent, it is possible to use propylene carbonate, acetonitrile, γ-butyrolactone, ethylene carbonate, sulfolane, dioxolane, tetrahydrofuran, 2-methyltetrahydrofuran, a dimethyl sulfoxide, 1,2-dimethoxyethane, 1,2-ethoxymethoxyethane, polyethylene glycol, an alcohol, a mixed solvent thereof, etc.

Furthermore, a liquid with a low viscosity is not required for the electrolyte solution 50 and it is possible to be a variety of forms such as gel-like, crosslinked polymer-type, and dispersed-liquid-crystal-type ones. In particular, it is preferable to form the electrolyte solution 50 into a gel-like or solid-like one in view of improvement of strength of an element, improvement of reliability, and prevention of coloring diffusion. For a solidification method, a method for holding an electrolyte and a solvent in a polymer resin is preferable because it is possible to obtain a high ionic conductivity and solid strength. Furthermore, for a polymer resin, a photo-curable resin is preferable because it is possible to manufacture an element at a low temperature and in a short period of time, as compared to thermal polymerization or a method for evaporating a solvent to provide a thin film.

The White Reflection Layer 43

The white reflection layer 43 is to improve a reflectance of a white color in a case where an electrochromic display element is used as a reflection-type display device. It is possible to fabricate the white reflection layer 43 by a method for dispersing a white pigment particle in the electrolyte solution 50 or applying and forming a resin with a white pigment particle dispersed therein, etc. For a material of a white pigment particle contained in the white reflection layer 43, for example, titanium oxide, aluminum oxide, zinc oxide, silica, cesium oxide, yttrium oxide, etc., are used.

The Insulating Layer 21

The insulating layer 21 is to electrically insulate or isolate the first display electrode 12 provided on and contacting the first electrochromic layer 13 and the second display electrode 22 provided with the second electrochromic layer 23. It is preferable for the first display electrode 12 and the second display electrode 22 that is an intermediate display electrode to be formed in such a manner that an electrical resistance between the first display electrode 12 and the second display electrode 22 is greater than in-plane electrical resistances of the first display electrode 12 and the second display electrode 22 in order to control electric potentials with respect to the opposed electrode 42 independently. Specifically, it is preferable that an electrical resistance between the first display electrode 12 and the second display electrode 22 is greater than or equal to 500 times in-plane electrical resistances of the first display electrode 12 and the second display electrode 22. Although it is possible to control a property of insulation between the first display electrode 12 and the second display electrode 22 by a layer thickness of the first electrochromic layer 13 or insulating layer 21, it is preferable to form and control the insulating layer 21. Furthermore, when the third display electrode and the third electrochromic layer and further the fourth display electrode and the fourth electrochromic layer are formed, it is preferable to insert an insulating layer for compensating an insulation property into respective display electrodes.

As long as a material for forming an insulating layer is porous, no particular limitation is provided thereto, and an organic material and inorganic material with a high insulating property, a high durability, and an excellent film formation property and a composite thereof are preferable.

For a method for forming a porous film, it is possible to use a publicly known formation method such as a sintering method (wherein polymer fine particles or inorganic particles are partially fused by adding a binder, etc., thereto, and a pore generated among particles is utilized), an extraction method (wherein a layer composed of an organic material or inorganic material soluble in a solvent and a binder insoluble in the solvent, etc., is formed and subsequently the organic material or inorganic material is dissolved in the solvent to obtain a pore), a foaming method (wherein a polymer, etc., is heated, degassed, etc., and then foamed), a phase conversion method for operating a good solvent and a poor solvent to cause phase separation of a mixture of polymers, or a radiation irradiation method for emitting each kind of a radiation ray to form a pore. For a specific example, there are provided a polymer-mixed particle film composed of a metal oxide fine particle (an $SiO_2$ particle, an $Al_2O_3$ particle, etc.) and a polymer binding agent, a porous organic film (a polyurethane resin or a polyethylene resin), an inorganic insulating material film formed on a porous film, etc.

Furthermore, it is preferable to combine with an inorganic film and use the insulating layer 21. It has an effect of reducing damage to an organic material in the insulating layer 21 that is a lower layer, the first electrochromic layer 13, etc., when the second display electrode 22 provided between the display electrode 12 formed on the display substrate 11 and the opposed electrode 42 is formed by a sputtering method.

For such an inorganic film, a material containing at least ZnS is preferable. ZnS has a characteristic in such a manner that it is possible to form a film at a high speed by a sputtering method without providing damage to the first electrochromic layer 13, etc. Moreover, for a material containing ZnS as a main component, it is possible to use $ZnS$—$SiO_2$, $ZnS$—$SiC$, $ZnS$—$Si$, $ZnS$—$Ge$, etc. Herein, it is preferable for a content of ZnS to be about 50-90 mol % to keep a good crystallinity when the insulating layer 21 is formed. Hence, a particularly preferable material is $ZnS$—$SiO_2$ (8/2), $ZnS$—$SiO_2$ (7/3), $ZnS$, $ZnS$—$ZnO$—$In_2O_3$—$Ga_2O_3$ (60/23/10/7). It is possible to obtain a thin film and a good insulating effect by using such a material of the insulating layer 21, and it is possible to prevent degradation of film strength as caused by providing a multilayer or releasing of a film.

A Variation Example of the First Embodiment

Next, a variation example of an electrochromic display device in the first embodiment will be described based on FIG. 3 and FIG. 4. Additionally, FIG. 4 is an enlarged view of an area surrounded by a broken line 3A in FIG. 3.

Figure 3:
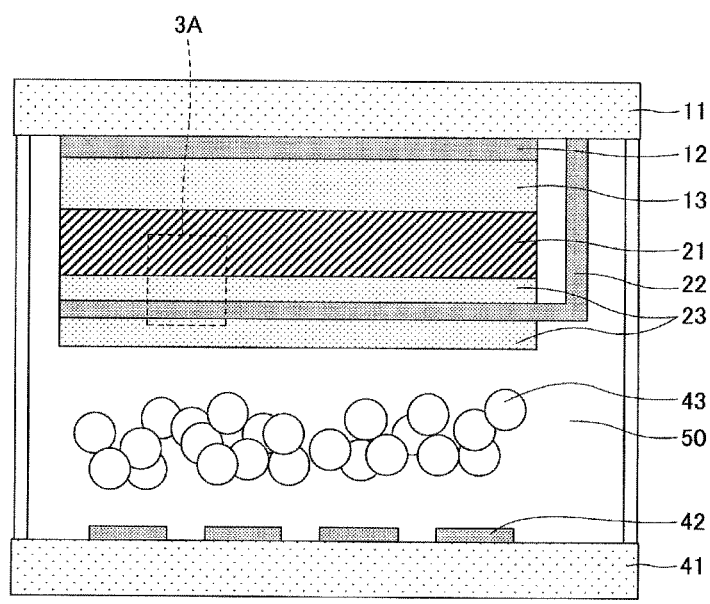
FIG. 3 is a structural diagram of a variation example of an electrochromic display device in a first embodiment.

As illustrated in FIG. 3, a variation example of an electrochromic display device in the first embodiment has a display substrate 11 and an opposed substrate 41 that are supporting substrates provided outside. The display substrate 11 has a first display electrode 12 formed on and contacting the display substrate 11, a first electrochromic layer 13 provided on and contacting the first display electrode 12, an insulating layer 21 provided on and contacting the first electrochromic layer 13, a second display electrode 22 provided separately from the insulating layer 21 and containing a rod-shaped, whisker-shaped, or a long-fiber-shaped electrically conductive particle, and a second electrochromic layer 23 provided on and contacting the second display electrode 22. Furthermore, an opposed electrode 42 is formed on a surface of the opposed substrate 41, wherein impregnation with an electrolyte solution 50 in which an electrolyte is dissolved is conducted and further a white reflection layer 43 is provided, between the first display electrode 12 formed on the display substrate 11 and the opposed electrode 42 formed on the opposed substrate 41.

The second display electrode 22 and the second electrochromic layer 23 are formed by using material similar to that of the electrochromic display device illustrated in FIG. 1 and FIG. 2, in accordance with a method similar thereto. However, the second display electrode 22 is provided separately from the insulating layer 21 as illustrated in FIG. 3 and FIG. 4, and hence, the order of formation is different. In the case of the electrochromic display device illustrated in FIG. 1 and FIG. 2, the second display electrode is formed on and contacts the insulating layer 21, and then, the second electrochromic layer 23 is formed thereon. Thereby, a part of the second electrochromic layer 23 penetrates into a gap between rod-shaped, whisker-shaped, or long-fiber-shaped electrically conductive particles that constitute the second display electrode so as to conduct formation thereof. On the other hand, as in the variation example illustrated in FIG. 3 and FIG. 4, a part of the second electrochromic layer 23 is formed on and contacts the insulating layer 21, then the second display electrode 22 is formed and contacts the second electrochromic layer 23, and further, a part of the second electrochromic layer 23 is formed on and contacts the second display electrode 22.

Figure 4:
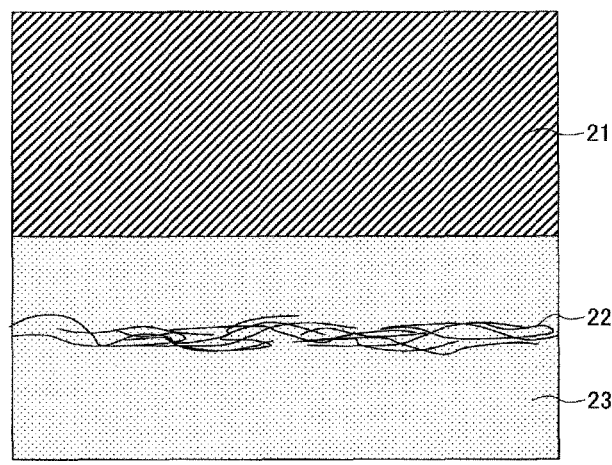
FIG. 4 is an illustration diagram of a second display electrode 22 and a second electrochromic layer 23 in a variation example of a first embodiment.

Hence, the second display electrode 22 has a form sandwiched by the second electrochromic layer 23 in the electrochromic display device illustrated in FIG. 3 and FIG. 4 as a variation example, and contact surface areas of the second display electrode 22 and second electrochromic layer 23 may be maximized.

Hence, for a positional relationship between the second display electrode 22 and the second electrochromic layer 23, the second display electrode 22 may be provided on and contact the insulating layer 21 as illustrated in FIG. 1 and FIG. 2. Furthermore, the second display electrode 22 may be provided in the second electrochromic layer 23 and separately from the insulating layer 21, like the variation example illustrated in FIG. 3 and FIG. 4.

A Second Embodiment

Next, an electrochromic display device in the second embodiment will be described. The present embodiment has an electrochromic layer that develops 3 kinds or different colors at a time of application of a voltage and is capable of providing a full color display.

Figure 5:
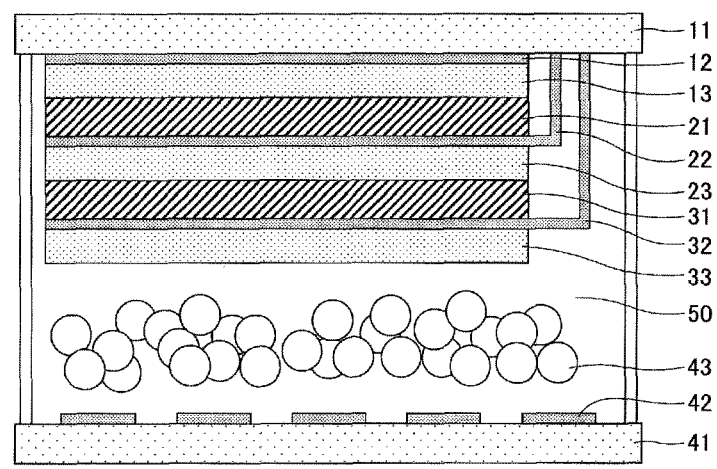
FIG. 5 is a structural diagram of an electrochromic display device in a second embodiment.

An electrochromic display device in the present embodiment will be described based on FIG. 5. The electrochromic display device in the present embodiment has a display substrate 11 and an opposed substrate 41 that are supporting substrates provided outside. The display substrate 11 has a first display electrode 12 formed on and contacting the display substrate 11, a first electrochromic layer 13 provided on and contacting the first display electrode 12, an insulating layer 21 provided on and contacting the first electrochromic layer 13, a second display electrode 22 provided on and contacting the insulating layer 21 and containing a rod-shaped, whisker-shaped, or long-fiber-shaped electrically conductive fine particle, a second electrochromic layer 23 provided on and contacting the second display electrode 22, an insulating layer 31 provided on and contacting the second electrochromic layer 23, a third display electrode 32 provided on and contacting the insulating layer 31 and containing a rod-shaped, whisker-shaped, or long-fiber-shaped electrically conductive fine particle, and a third electrochromic layer 33 provided on and contacting the third display electrode 32. Furthermore, the opposed electrode 42 is formed on a surface of the opposed substrate 41, wherein impregnation with an electrolyte solution 50 in which an electrolyte is dissolved is conducted, and further a white reflection layer 43 is provided, between the first display electrode 12 formed on the display substrate 11 and the opposed electrode 42 formed on the opposed substrate 41. Additionally, the second display electrode 22 and the second electrochromic layer 23 being laminated may be described as a lamination film in the present embodiment, and further, the third display electrode 32 and the third electrochromic layer 33 being laminated may be described as a lamination film. Thus, 2 lamination films are laminated in the present embodiment.

The insulating layer 31 is formed by using a material similar to that of the insulating layer 21, etc., in accordance with a method similar thereto.

Furthermore, the third display electrode 32 is an intermediate electrode and is formed by using a material similar to that of the second display electrode 22, etc., in accordance with a method similar thereto. Additionally, the second display electrode 22 and the third display electrode 32 may be described as a first intermediate display electrode and a second intermediate display electrode, respectively, in the present embodiment.

Furthermore, the third electrochromic layer 33 is formed of a material that is like or similar to those of the first electrochromic layer 13 and the second electrochromic layer 23 and develops a color different from those of the first electrochromic layer 13 and second electrochromic layer 23. For a formation method, it is possible to conduct formation by a method like or similar to that of the second electrochromic layer 23.

The electrochromic display device in the present embodiment is formed, for example, in such a manner that when a voltage is applied thereto, the first electrochromic layer 13 develops a magenta color, the second electrochromic layer 23 develops a yellow color, and the third electrochromic layer 33 develops a cyan color. Thereby, it is possible for the electrochromic display device in the present embodiment to provide a full color display.

Practical Examples

Practical examples of the electrochromic display device in the first embodiment will be described. Specifically, electrochromic display devices in Practical example 1, Practical example 2, Comparative example 1, and Comparative example 2 were fabricated for illustrating practical examples of the electrochromic display device in the first embodiment. The electrochromic display devices in Practical example 1, Practical example 2, Comparative example 1, and Comparative example 2 will be described below.

Practical Example 1

The First Display Electrode 12 and the First Electrochromic Layer 13

An ITO film with a thickness of about 100 nm was formed by a sputtering method, on a 20 mm×20 mm area and a portion for providing an extraction electrode on a 40 mm×40 mm glass substrate through a metal mask to form a first display electrode 12. A titanium oxide fine particle dispersion fluid (SP210 SHOWA TITANIUM) was spin-coated thereon and subjected to an anneal treatment at 120° C. for 15 minutes to form a titanium oxide particle film, and further a 1 wt % solution of a viologen compound as an electrochromic compound to develop a magenta color in 2,2,3,3-tetrafluoropropanol was pin-coated thereon and subjected to an anneal treatment at 120° C. for 10 minutes to form the first electrochromic layer 13 composed of titanium oxide particles and the electrochromic compound.

The Insulating Layer 21

Then, spin-coating with a dispersion fluid of silica fine particles with an average primary particle diameter of 20 nm (silica solid concentration 13% by weight, 2% by weight of an aqueous polyester-type urethane resin (HW350 DIC Corporation), and 85% by weight of 2,2,3,3-tetrafluoropropanol) was conducted subsequently, and sintering at 120° C. for 10 minutes was conducted to obtain an insulating layer with an average film thickness of about 1 µm. Then, an inorganic insulating layer of ZnS—SiO$_2$ (8/2) with a film thickness of 100 nm was formed thereon by a sputtering method. Thus, the insulating layer 21 was formed.

The Second Display Electrode 22

A dispersion fluid of carbon nanotubes with an average diameter of about 15 nm and an average length of about 3 µm (carbon nanotube concentration 0.1% by weight, 19.9% by weight of water, and 80% by weight of 2,2,3,3-tetrafluoropropanol was applied and formed by a spray on a 20 mm×20 mm area overlapping with the first electrode 12 on the insulating layer 21 through a shadow mask, to fabricate a second display electrode 22 as an intermediate display electrode. Herein, an extraction electrode for the second display electrode 22 was formed on a part different from that of the extraction electrode for the first display electrode 12. Thereby, the second display electrode 22 was formed as an intermediate display electrode.

A surface resistivity of the second display electrode 22 measured by a resistivity meter (Loresta, produced by Mitsubishi Chemical Corporation) was $1.1 \times 10^3 \Omega/\square$ and an average transmittance of visible light rays was 70%. Furthermore, the measured resistance between an extraction electrode of the first display electrode 12 and the extraction electrode of the second display electrode 22 was greater than or equal to 40 MΩ to provide an insulating state.

The Second Electrochromic Layer 23

A titanium oxide fine particle dispersion fluid (SP210 SHOWA TITANIUM) was spin-coated thereon and subjected to an anneal treatment at 120° C. for 15 minutes to form a titanium oxide particle film, and further a 1 wt % solution of a viologen compound as an electrochromic compound to develop a yellow color in 2,2,3,3-tetrafluoropropanol was spin-coated thereon and subjected to an anneal treatment at 120° C. for 10 minutes to form the second electrochromic layer 23 composed of titanium oxide particles and the electrochromic compound. As a cross-sectional SEM image was observed on such a condition, a space in the second display electrode 22 as an intermediate display electrode formed by carbon nanotubes was filled with the second electrochromic layer 23 and the second electrochromic layer 23 was formed on and contacted the insulating layer 21.

The Opposed Electrode 42

An ITO film with about 100 nm was formed on each of three 7 mm×15 mm areas and extraction portions thereof on a 40 mm×40 mm glass substrate by a sputtering method through a metal mask to provide the opposed electrode 42.

Fabrication of an Electrochromic Display Device

After an electrolyte solution 50 for which 20 wt % of white titanium oxide particles (trade name: CR50, produced by ISHIHARA SANGYO KAISHA, LTD., average particle diameter: about 250 nm) were added into a solution provided by mixing tetrabutylammonium perchlorate as an electrolyte, dimethyl sulfoxide and polyethylene glycol (molecular weight: 200) as solvents and further a UV curable adhesive (trade name: PTC10, produced by JUJO CHEMICAL CO., LTD.) at 1.2:5.4:6:16 was prepared, and dropped onto and applied to a side of the opposed substrate 41, superposition with the display substrate 11 and UV light irradiation from a side of the opposed substrate 41 were conducted to cause curing and bonding, so that an electrochromic display device in Practical example 1 was fabricated. Additionally, a thickness of an electrolyte layer was set at 10 μm by mixing 0.2 wt % of bead spacers into the electrolyte layer.

A Coloring Test

An evaluation of coloring of the electrochromic display device in Practical example 1 fabricated as described above was conducted. While two of the three opposed electrodes 42 were connected to a cathode and the first display electrode 12 was connected to an anode, a voltage of +6V was applied for 500 milliseconds by using a constant voltage electric source until a sufficient coloring density was provided. In the first electrochromic layer 13, magenta color areas reflecting shapes of the two selected opposed electrodes 42 were observed. Then, while one of the previously selected opposed electrodes 42 and one more non-selected one were both connected to a cathode and the second display electrode was connected to an anode, a voltage of +6V was applied for 2000 milliseconds by using a constant voltage electric source until a sufficient coloring density was provided. In the second electrochromic layer 23, yellow color areas reflecting shapes of the two selected opposed electrodes 42 were observed. Among those, an area with a red color that was a subtractive color mixture of magenta and yellow was observed directly above the successively selected opposed electrode 42.

Practical Example 2

In a structure similar to that of Practical example 1, a method for formation of the second display electrode 22 was changed to that described below to fabricate an electrochromic display device in Practical example 2.

The Second Display Electrode 22

Silver nanowires with an average minor axis length of 84 nm and a major axis length of 35 μm were prepared and subjected to electroless gold plating based on a publicly known technique to obtain silver nanowires with a thickness of about 5 nm to which gold plating treatment had been applied. After neutralization treatment, washing with deionized water and centrifugation were repeated to isolate silver nanowires to which gold plating treatment had been applied. Isolated silver nanowires were dispersed in a mixed solvent of water and 2-propanol (weight ratio 50:50) to prepare 0.8% by weight of silver nanowire ink A (first silver nanowire ink).

This silver nanowire ink A (first silver nanowire ink) was applied and formed on an 20 mm×20 mm area of insulating layer 21 that superposed the first display electrode 12 by spraying through a shadow mask to fabricate the second display electrode 22. Then, an extraction electrode of the second display electrode 22 was formed on a portion different from that of the extraction electrode of the first display electrode 12. Thereby, the second display electrode 22 was formed as an intermediate display electrode.

A surface resistivity of the second display electrode 22 measured by a resistivity meter (Loresta, produced by Mitsubishi Chemical Corporation) was $6.5 \times 10^2 \Omega/$ and an average transmittance of visible light rays was 80%. Furthermore, a measured resistance between the extraction electrode of the first display electrode 12 and the extraction electrode of the second display electrode 22 was greater than or equal to 40 MΩ, to provide an insulating state.

A Coloring Test

An evaluation of coloring of the electrochromic display device in Practical example 2 fabricated as described above was conducted. While two of the three opposed electrodes 42 were connected to a cathode and the first display electrode 12 was connected to an anode, a voltage of +6V was applied for 500 milliseconds by using a constant voltage electric source. In the first electrochromic layer 13, magenta color areas reflecting shapes of the two selected opposed electrodes 42 were observed. Then, while one of the previously selected opposed electrodes 42 and one more non-selected one were both connected to a cathode and the second display electrode 22 was connected to an anode, a voltage of +6V was applied for 1000 milliseconds by using a constant voltage electric source. In the second electrochromic layer 23, yellow color areas reflecting shapes of the two selected opposed electrodes 42 were observed. Among those, an area with a red color that was a subtractive color mixture of magenta and yellow was observed directly above the successively selected opposed electrode 42.

Comparative Example 1

In a structure similar to that of Practical example 1, the second display electrode was changed to that described below to fabricate an electrochromic display device in Comparative example 1.

The Second Display Electrode

An ITO film with about 100 nm was formed on a 20 mm×20 mm area of the insulating layer formed on the first display electrode and superposing the first display electrode by sputtering through a metal mask to form a second display electrode. Then, an extraction electrode of the second display electrode was formed on a portion different from that of the extraction electrode of the first display electrode. Thereby, the second display electrode was formed as an intermediate display electrode.

A measured resistance between the extraction electrode of the first display electrode and the extraction electrode of the second display electrode was greater than or equal to 40 MΩ to provide an insulating state.

A Coloring Test

An evaluation of coloring of the electrochromic display device in Comparative example 1 fabricated as described above was conducted. While two of the three opposed electrodes were connected to a cathode and the first display electrode was connected to an anode, a voltage of +6V was applied for 10 seconds by using a constant voltage electric source. Whereas a coloring reaction could not be found in the first electrochromic layer, yellow color areas reflecting shapes of the two selected opposed electrodes were observed in the second electrochromic layer. Then, while one of the previously selected opposed electrodes 42 and one more non-selected one were both connected to a cathode and the second display electrode was connected to an anode, a voltage of +6V was applied for 500 milliseconds by using a constant voltage electric source. In the second electrochromic layer, yellow color areas reflecting shapes of the two selected opposed electrodes were observed. Even when an ITO film formed by sputtering was used as the second display electrode, a coloring reaction could not be found in the first electrochromic layer due to a poor ion permeability.

Comparative Example 2

In a structure similar to that of Practical example 1, the second display electrode was changed to that described below to fabricate an electrochromic display device in Comparative example 2.

The Second Display Electrode

An ITO nanoparticle ink was prepared by dispersing ITO nanoparticles with an average primary particle diameter of 50 nm in a mixed liquid of 2,2,3,3-tetrafluoropropanol and ethylene glycol (weight ratio 90:10) in such a manner that a solid concentration thereof is 10% by weight. This prepared liquid was spin-coated on the insulating layer on the first display electrode and dried at 120° C. for 5 minutes to form an ITO nanoparticle layer with about 500 nm. Additionally, an area superposing the extraction electrode of the first display electrode and corresponding to an extraction electrode of the second display electrode was wiped off. Thereby, the second display electrode was formed as an intermediate display electrode.

A surface resistivity of an applied film spin-coated with the ITO nanoparticle ink formed on a glass substrate, as measured by a resistivity meter (Loresta, produced by Mitsubishi Chemical Corporation), was $1.2 \times 10^5 \Omega/$.

A Coloring Test

An evaluation of coloring of the electrochromic display device in Comparative example 2 fabricated as described above was conducted. While two of the three opposed electrodes were connected to a cathode and the first display electrode was connected to an anode, a voltage of +6V was applied for 500 milliseconds by using a constant voltage electric source. In the first electrochromic layer, magenta color areas reflecting shapes of the two selected opposed electrodes were observed. Then, while one of the previously selected opposed electrodes and one more non-selected one were both connected to a cathode and the second display electrode was connected to an anode, a voltage of +6V was applied for 10 seconds by using a constant voltage electric source. However, in the second electrochromic layer, yellow color areas reflecting shapes of the two selected opposed electrodes were not observed. Even when ITO nanoparticles were used as the second display electrode, a coloring reaction could not be found in the second electrochromic layer due to a poor electrical conductivity.

Practical Example 3

In a structure similar to that of Practical example 1, the second display electrode was changed to that described below to fabricate an electrochromic display device in Practical example 3.

The Second Display Electrode

Silver nanowires with an average minor axis length of 84 nm and a major axis length of 35 μm were prepared and dispersed in a mixed solvent of water and 2-propanol (weight ratio 50:50) without conducting a plating treatment, etc., to prepare 0.8% by weight of silver nanowire ink B (second silver nanowire ink).

This silver nanowire ink B (second silver nanowire ink) was applied and formed on an 20 mm×20 mm area of insulating layer 21 that superposed the first display electrode 12 by spraying through a shadow mask to fabricate the second display electrode 22. Then, an extraction electrode of the second display electrode 22 was formed on a portion different from that of the extraction electrode of the first display electrode 12. Thereby, the second display electrode 22 was formed as an intermediate display electrode.

A surface resistivity of the second display electrode 22 measured by a resistivity meter (Loresta, produced by Mitsubishi Chemical Corporation) was $5.8 \times 10^2 \Omega/$ and an average transmittance of visible light rays was 80%. Furthermore, a measured resistance between the extraction electrode of the first display electrode 12 and the extraction electrode of the second display electrode 22 was greater than or equal to 40 MΩ to provide an insulating state.

A Coloring Test

An evaluation of coloring of the electrochromic display device in Practical example 3 fabricated as described above was conducted. While two of the three opposed electrodes 42 were connected to a cathode and the first display electrode 12 was connected to an anode, a voltage of +6V was applied for 500 milliseconds by using a constant voltage electric source. In the first electrochromic layer 13, magenta color areas reflecting shapes of the two selected opposed electrodes 42 were observed. Then, while one of the previously selected opposed electrodes 42 and one more non-selected one were both connected to a cathode and the second display electrode 22 was connected to an anode, a voltage of +6V was applied for 1000 milliseconds by using a constant voltage electric source. In the second electrochromic layer 23, yellow color areas reflecting shapes of the two selected opposed electrodes 42 were observed. Among those, an area with a red color that was a subtractive color mixture of magenta and yellow was observed directly above the successively selected opposed electrode 42. However, after few minutes, the second display electrode 22 contacting a yellow exhibiting area in the second electrochromic layer was changed to yellow, wherein degradation of the electrode was found, and thereafter, a color could never be developed.

Practical Example 4

The first display electrode and the second display electrode were changed to a formation sequence described below, by using materials similar to those of Practical example 1, to fabricate an electrochromic display device in Practical example 4.

The First Display Electrode 12 and the First Electrochromic Layer 13

Formation was conducted by a method similar to that of Practical example 1.

The Insulating Layer 21

Formation was conducted by a method similar to that of Practical example 1.

A Part of the Second Electrochromic Layer 23

A titanium oxide fine particle dispersion fluid (SP210 SHOWA TITANIUM) was spin-coated thereon and subjected to an anneal treatment at 120° C. for 15 minutes to form a titanium oxide particle film. Furthermore, a 1 wt % solution of a viologen compound as an electrochromic compound to develop a yellow color in 2,2,3,3-tetrafluoropropanol was spin-coated thereon and an anneal treatment at 120° C. for 10 minutes was conducted. Thereby, a part of the second electrochromic layer 23 composed of titanium oxide particles and the electrochromic compound was formed. A concentration of the titanium oxide fine particle dispersion fluid and a rotational speed for spin-coating were adjusted in such a manner that a film thickness was approximately a half of that in the case of Practical example 1.

The Second Display Electrode 22

Formation was conducted by a method similar to that of Practical example 1.

A Part of the Second Electrochromic Layer 23

Then, a titanium oxide fine particle dispersion fluid (SP210 SHOWA TITANIUM) was spin-coated thereon and subjected to an anneal treatment at 120° C. for 15 minutes to form a titanium oxide particle film, and further a 1 wt % solution of a viologen compound as an electrochromic compound to develop a yellow color in 2,2,3,3-tetrafluoropropanol was spin-coated thereon and subjected to an anneal treatment at 120° C. for 10 minutes. Thereby, a part of the second electrochromic layer 23 composed of the titanium oxide particles and the electrochromic compound was formed. As a cross-sectional SEM image was observed on such a condition, a space in the second display electrode 22 as an intermediate display electrode formed by carbon nanotubes was filled with the second electrochromic layer 23. Furthermore, the second display electrode 22 was formed at a central portion of the second electrochromic layer 23 separately from the insulating layer 21.

The Opposed Electrode 42

Formation was conducted by a method similar to that of Practical example 1.

Fabrication of an Electrochromic Display Device

Formation was conducted by a method similar to that of Practical example 1.

A Coloring Test

An evaluation of coloring of the electrochromic display device in Practical example 4 fabricated as described above was conducted. While two of the three opposed electrodes 42 were connected to a cathode and the first display electrode 12 was connected to an anode, a voltage of +6V was applied for 500 milliseconds by using a constant voltage electric source until a sufficient coloring density was provided. In the first electrochromic layer 13, magenta color areas reflecting shapes of the two selected opposed electrodes 42 were observed. Then, while one of the previously selected opposed electrodes 42 and one more non-selected one were both connected to a cathode and the second display electrode was connected to an anode, a voltage of +6V was applied for 2000 milliseconds by using a constant voltage electric source until a sufficient coloring density was provided. In the second electrochromic layer 23, yellow color areas reflecting shapes of the two selected opposed electrodes 42 were observed. Among those, an area with a red color that was a subtractive color mixture of magenta and yellow was observed directly above the successively selected opposed electrode 42.

Although an embodiment of the present invention has been described, the content(s) described above shall not limit a content(s) of an embodiment of the present invention.

APPENDIX

<An Illustrative Embodiment(s) of an Electrochromic Display Device and a Method for Manufacturing an Electrochromic Display Device>

At least one illustrative embodiment of the present invention may relate to at least one of an electrochromic display device and a method for manufacturing an electrochromic display device.

An object of at least one illustrative embodiment of the present invention may be to provide an electrochromic display device having a lower driving voltage, being more excellent in a display quality, and being capable of a multicolor display, by a simple technique to provide an intermediate display electrode with an electrical conductivity and an ionic permeability that are more excellent.

At least one illustrative embodiment of the present invention may be an electrochromic display device having a display substrate, a display electrode provided on the display substrate, a first electrochromic layer provided on the display electrode, an intermediate display electrode provided above the first electrochromic layer separately from the first electrochromic layer, a second electrochromic layer provided on and contacting the intermediate display electrode, an opposed substrate, an opposed electrode provided on the opposed substrate, and an electrolyte solution provided between a surface of the display substrate on which the display electrode is formed and a surface of the opposed substrate on which the opposed electrode is formed, characterized in that the intermediate display electrode contains a rod-shaped, whisker-shaped, or long-fiber-shaped electrically conductive fine particle, and at least a portion of a space in the electrically conductive fine particle is filled with a material forming the second electrochromic layer.

Furthermore, at least one illustrative embodiment of the present invention may be an electrochromic display device having a display substrate, a display electrode provided on the display substrate, a first electrochromic layer provided on the display electrode, an intermediate display electrode provided above the first electrochromic layer separately from the first electrochromic layer, a second electrochromic layer provided on and contacting the intermediate display electrode, an opposed substrate, an opposed electrode provided on the opposed substrate, and an electrolyte solution provided between a surface of the display substrate on which the display electrode is formed and a surface of the opposed substrate on which the opposed electrode is formed, characterized in that the intermediate display electrode contains a rod-shaped, whisker-shaped, or long-fiber-shaped electrically conductive fine particle and a part of the electrically conductive fine particle forming the intermediate display electrode penetrates into a part of the second electrochromic layer.

Furthermore, at least one illustrative embodiment of the present invention may be an electrochromic display device having a display substrate, a display electrode provided on the display substrate, an electrochromic layer provided on the display electrode, an opposed substrate, an opposed electrode provided on the opposed substrate, and an electrolyte solution provided between a surface of the display substrate on which the display electrode is formed and a surface of the opposed substrate on which the opposed electrode is formed, characterized in that 1 or 2 or more of lamination films formed by laminating an intermediate display electrode provided separately from the electrochromic layer and an other electrochromic layer provided on and contacting the intermediate display electrode are laminated on the electrochromic layer, the intermediate display electrode contains a rod-shaped, whisker-shaped, or long-fiber-shaped electrically conductive fine particle, and at least a portion of a space in the electrically conductive fine particle is filled with a material forming the other electrochromic layer.

Furthermore, at least one illustrative embodiment of the present invention may be a method for manufacturing an electrochromic display device having a display substrate, a display electrode provided on the display substrate, a first electrochromic layer provided on the display electrode, an intermediate display electrode provided above the first electrochromic layer separately from the first electrochromic layer, a second electrochromic layer provided on and contacting the intermediate display electrode, an opposed substrate, an opposed electrode provided on the opposed substrate, and an electrolyte solution provided between a surface of the display substrate on which the display electrode is formed and a surface of the opposed substrate on which the opposed electrode is formed, characterized in that the intermediate display electrode contains a rod-shaped, whisker-shaped, or long-fiber-shaped electrically conductive fine particle, at least a portion of a space in the electrically conductive fine particle is filled with a material forming the second electrochromic layer, and a part of the second electrochromic layer is formed before the intermediate display electrode is formed.

Illustrative Embodiment (1) is an electrochromic display device having a display substrate, a display electrode provided on the display substrate, a first electrochromic layer provided on the display electrode, an intermediate display electrode provided above the first electrochromic layer separately from the first electrochromic layer, a second electrochromic layer provided on and contacting the intermediate display electrode, an opposed substrate, an opposed electrode provided on the opposed substrate, and an electrolyte solution provided between a surface of the display substrate on which the display electrode is formed and a surface of the opposed substrate on which the opposed electrode is formed, characterized in that the intermediate display electrode contains a rod-shaped, whisker-shaped, or long-fiber-shaped electrically conductive fine particle, and at least a portion of a space in the electrically conductive fine particle is filled with a material forming the second electrochromic layer.

Illustrative Embodiment (2) is an electrochromic display device having a display substrate, a display electrode provided on the display substrate, a first electrochromic layer provided on the display electrode, an intermediate display electrode provided above the first electrochromic layer separately from the first electrochromic layer, a second electrochromic layer provided on and contacting the intermediate display electrode, an opposed substrate, an opposed electrode provided on the opposed substrate, and an electrolyte solution provided between a surface of the display substrate on which the display electrode is formed and a surface of the opposed substrate on which the opposed electrode is formed, characterized in that the intermediate display electrode contains a rod-shaped, whisker-shaped, or long-fiber-shaped electrically conductive fine particle and a part of the electrically conductive fine particle forming the intermediate display electrode penetrates into a part of the second electrochromic layer.

Illustrative Embodiment (3) is the electrochromic display device as described in Illustrative Embodiment (1) or (2), characterized in that the intermediate display electrode is buried and formed in the second electrochromic layer.

Illustrative Embodiment (4) is the electrochromic display device as described in any of Illustrative Embodiments (1) to (3), characterized in that an insulating layer is provided between the first electrochromic layer and the intermediate display electrode or the first electrochromic layer and the second electrochromic layer.

Illustrative Embodiment (5) is an electrochromic display device having a display substrate, a display electrode provided on the display substrate, an electrochromic layer provided on the display electrode, an opposed substrate, an opposed electrode provided on the opposed substrate, and an electrolyte solution provided between a surface of the display substrate on which the display electrode is formed and a surface of the opposed substrate on which the opposed electrode is formed, characterized in that 1 or 2 or more of lamination films formed by laminating an intermediate display electrode provided separately from the electrochromic layer and an other electrochromic layer provided on and contacting the intermediate display electrode are laminated on the electrochromic layer, the intermediate display electrode contains a rod-shaped, whisker-shaped, or long-fiber-shaped electrically conductive fine particle, and at least a portion of a space in the electrically conductive fine particle is filled with a material forming the other electrochromic layer.

Illustrative Embodiment (6) is the electrochromic display device as described in any of Illustrative Embodiments (1) to (5), characterized in that the display electrode and the intermediate display electrode are transparent or translucent.

Illustrative Embodiment (7) is the electrochromic display device as described in any of Illustrative Embodiments (1) to (6), characterized in that the rod-shaped, whisker-shaped, or long-fiber-shaped electrically conductive fine particle contains carbon.

Illustrative Embodiment (8) is the electrochromic display device as described in any of Illustrative Embodiments (1) to (6), characterized in that the rod-shaped, whisker-shaped, or long-fiber-shaped electrically conductive fine particle contains silver.

Illustrative Embodiment (9) is the electrochromic display device as described in any of Illustrative Embodiments (1) to (7), characterized in that the rod-shaped, whisker-shaped, or long-fiber-shaped electrically conductive fine particle contains a carbon nanotube.

Illustrative Embodiment (10) is the electrochromic display device as described in any of Illustrative Embodiments (1) to (9), characterized in that a part of or all the rod-shaped, whisker-shaped, or long-fiber-shaped electrically conductive fine particle is covered with a protective layer formed of a semiconductor or a material having an electrical conductivity.

Illustrative Embodiment (11) is the electrochromic display device as described in Illustrative Embodiment (10), characterized in that the protective layer contains 1 or 2 or more metals selected from gold, platinum, or palladium.

Illustrative Embodiment (12) is a method for manufacturing an electrochromic display device having a display substrate, a display electrode provided on the display substrate, a first electrochromic layer provided on the display electrode, an intermediate display electrode provided above the first electrochromic layer separately from the first electrochromic layer, a second electrochromic layer provided on and contacting the intermediate display electrode, an opposed substrate, an opposed electrode provided on the opposed substrate, and an electrolyte solution provided between a surface of the display substrate on which the display electrode is formed and a surface of the opposed substrate on which the opposed electrode is formed, characterized in that the intermediate display electrode contains a rod-shaped, whisker-shaped, or long-fiber-shaped electrically conductive fine particle, at least a portion of a space in the electrically conductive fine particle is filled with a material forming the second electrochromic layer, and a part of the second electrochromic layer is formed before the intermediate display electrode is formed.

According to at least one illustrative embodiment of the present invention, it may be possible to obtain an electrochromic display device having a lower driving voltage, being more excellent in display quality, and being capable of a multicolor display.

Although the illustrative embodiments and specific examples of the present invention have been described with reference to the accompanying drawings, the present invention is not limited to any of the illustrative embodiments and specific examples, and the illustrative embodiments and specific examples may be altered, modified, or combined without departing from the scope of the present invention.

The present application claims the benefit of priority based on Japanese Patent Application No. 2012-066676 filed on Mar. 23, 2012 and Japanese Patent Application No. 2012-265704 filed on Dec. 4, 2012, the entire contents of which are hereby incorporated by reference herein.

What is claimed is:

1. An electrochromic display device comprising: a display substrate; a display electrode provided on the display substrate; a first electrochromic layer provided on the display electrode; an intermediate display electrode provided above the first electrochromic layer separately from the first electrochromic layer; a second electrochromic layer formed of electrically conducive fine metal oxide particles provided on and contacting the intermediate display electrode; an opposed substrate; an opposed electrode provided on the opposed substrate; and an electrolyte solution provided between a surface of the display substrate on which the display electrode is formed and a surface of the opposed substrate on which the opposed electrode is formed, wherein the intermediate display electrode contacting the second electrochromic layer is formed by rod-shaped, whisker-shaped, or long-fiber-shaped electrically conductive fine particles having an aspect ratio of a length in a major axis direction to a length in a minor axis direction of greater than or equal to 10; and at least a portion of a space between the electrically conductive fine particles of the intermediate display electrode is filled with at least some of the electrically conductive fine metal oxide particles of the second electrochromic layer; wherein the intermediate display electrode is buried and formed in the second electrochromic layer.

2. The electrochromic display device as claimed in claim 1, wherein an insulating layer is provided between the first electrochromic layer and the intermediate display electrode or the first electrochromic layer and the second electrochromic layer.

3. The electrochromic display device as claimed in claim 1, wherein the display electrode and the intermediate display electrode are transparent or translucent.

4. The electrochromic display device as claimed in claim 1, wherein the rod-shaped, whisker-shaped, or long-fiber-shaped electrically conductive fine particle contains carbon.

5. The electrochromic display device as claimed in claim 1, wherein the rod-shaped, whisker-shaped, or long-fiber-shaped electrically conductive fine particle contains silver, and a protective layer is provided on a surface of the electrically conductive fine particle.

6. The electrochromic display device as claimed in claim 1, wherein the rod-shaped, whisker-shaped, or long-fiber-shaped electrically conductive fine particle contains a carbon nanotube.

7. The electrochromic display device as claimed in claim 1, wherein a part of or all the rod-shaped, whisker-shaped, or long-fiber-shaped electrically conductive fine particle is covered with a protective layer formed of a semiconductor or a material having an electrical conductivity.

8. The electrochromic display device as claimed in claim 7, wherein the protective layer contains 1 or 2 or more metals selected from gold, platinum, or palladium.

9. A method for manufacturing an electrochromic display device including: a display substrate; a display electrode provided on the display substrate; a first electrochromic layer provided on the display electrode; an intermediate display electrode provided above the first electrochromic layer separately from the first electrochromic layer, a second electrochromic layer formed of electrically conducive fine metal oxide particles provided on and contacting the intermediate display electrode; an opposed substrate; an opposed electrode provided on the opposed substrate; and an electrolyte solution provided between a surface of the display substrate on which the display electrode is formed and a surface of the opposed substrate on which the opposed electrode is formed, wherein the intermediate display electrode contacting the second electrochromic layer is formed by rod-shaped, whisker-shaped, or long-fiber-shaped electrically conductive fine particles having an aspect ratio of a length in a major axis direction to a length in a minor axis direction of greater than or equal to 10; at least a portion of a space between the electrically conductive fine particles of the intermediate display electrode is filled with at least some of the electrically conductive fine metal oxide particles of the second electrochromic layer; and a part of the second electrochromic layer is formed before the intermediate display electrode is formed; wherein the intermediate display electrode is buried and formed in the second electrochromic layer.

* * * * *